(12) United States Patent
Tsai (10) Patent No.: US 7,715,130 B2
(45) Date of Patent: May 11, 2010

(54) LENS MODULE

(75) Inventor: Ming-Chiang Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 26 days.

(21) Appl. No.: 12/135,860

(22) Filed: Jun. 9, 2008

(65) Prior Publication Data

US 2009/0103195 A1    Apr. 23, 2009

(30) Foreign Application Priority Data

Oct. 22, 2007    (CN)    ............ 2007 1 0202200

(51) Int. Cl.
*G02B 7/02* (2006.01)

(52) U.S. Cl. ............................. 359/824; 359/822
(58) Field of Classification Search ......... 359/694–700, 359/819–824
See application file for complete search history.

(56) References Cited

U.S. PATENT DOCUMENTS 5,490,015 A * 2/1996 Umeyama et al. ........... 359/824
2007/0279765 A1 * 12/2007 Takahashi ................... 359/697

* cited by examiner

*Primary Examiner*—Mohammed Hasan
(74) *Attorney, Agent, or Firm*—Andrew C. Cheng (57) ABSTRACT

An exemplary lens module includes a barrel, a holder, an optical assembly, an image sensor, at least one permanent-magnet, a number of electromagnets, and a control unit. The barrel is threaddedly engaged in the holder. The barrel is capable of being linearly movable relative to the holder. The optical assembly is received in the barrel. The image sensor is received in the holder and is configured for capturing images. The at least one permanent magnet is mounted on the barrel. The electromagnets are mounted on the holder and surround the barrel therein for magnetical interaction with the permanent magnet. The control unit electrically is connected to the electromagnets and is configured for changing the magnetic polarities of the electromagnets adjacent to the permanent magnet to create a combined magnetic torsional force applied onto the permanent magnet, thereby rotating the barrel relative to the holder.

14 Claims, 9 Drawing Sheets

LENS MODULE

BACKGROUND

1. Technical Field

The present invention relates to lens modules, particularly to a lens module that is capable of auto focusing.

2. Description of Related Art

Auto focus techniques have been widely employed in various imaging systems, including, e.g., still camera systems and video camera systems. Nowadays, there are two main auto focus methods: one is an active focus (i.e., distance metering) method, and the other one is a passive focus (i.e., focus detecting) method. In particular, the passive focus method mainly employs a charge-coupled device (CCD) and works by evaluating the amount of contrast or the phase difference in a scene. The active focus method usually utilizes an infrared light or an ultrasound emitter and a corresponding receiver in a triangular surveying system. Data generated by the triangular surveying system is converted by a microprocessor into information about a moving distance of a lenses assembly of an auto-focus imaging system, thereby enabling automatic focusing of the auto-focus imaging system.

Generally, a typical auto focus lens module includes an optical imaging assembly, an image sensor, a control unit and an actuator. The optical imaging assembly usually includes a movable lens assembly. The actuator commonly includes either a stepper motor or a voice motor, and a driving circuitry. The driving circuitry, regulated by the control unit, can drive the stepper motor or the voice motor to perform a rotational movement. In order to carry out the position adjustment of the movable lens assembly in an automatic focusing process, a mechanism (e.g., a gear assembly) has necessarily been employed to transform the rotational movement of the stepper motor or the voice motor into linear movement. However, the existence of the actuator and the gear assembly generally makes the typical auto focus lens module unduly bulky.

What is needed, therefore, is an auto focus lens module having a compact configuration.

SUMMARY

A present embodiment provides a lens module. The lens module includes a barrel, a holder, an optical assembly, an image sensor, at least one permanent-magnet, a number of electromagnets, and a control unit. The barrel is threadedly engaged in the holder. The barrel is capable of being linearly movable relative to the holder. The optical assembly is received in the barrel. The image sensor is received in the holder and is configured for capturing images. The at least one permanent magnet is mounted on the barrel. The electromagnets are mounted on the holder and surround the barrel therein for magnetical interaction with the permanent magnet. The control unit electrically is connected to the electromagnets and is configured for changing the magnetic polarities of the electromagnets adjacent to the permanent magnet to create a combined magnetic torsional force applied onto the permanent magnet, thereby rotating the barrel relative to the holder.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below and with reference to the drawings.

Figure 1:
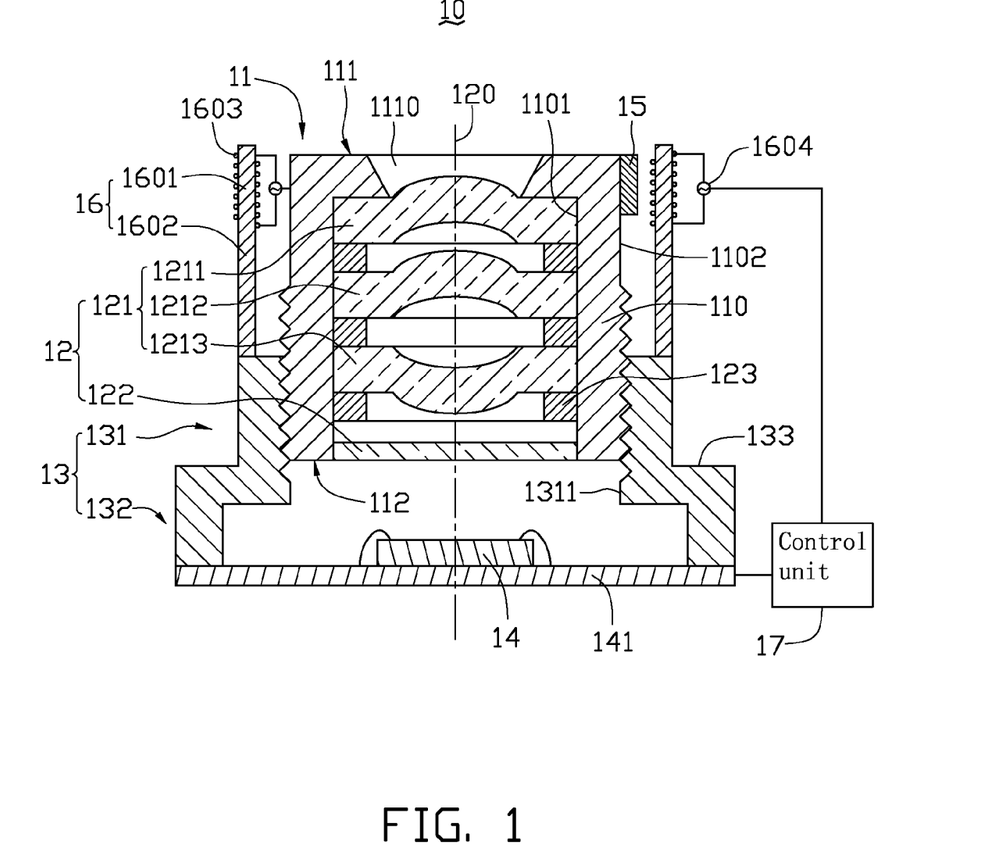
FIG. 1 is a schematic, cross-sectional view of a lens module according to a first embodiment of the present invention.
Figure 2:
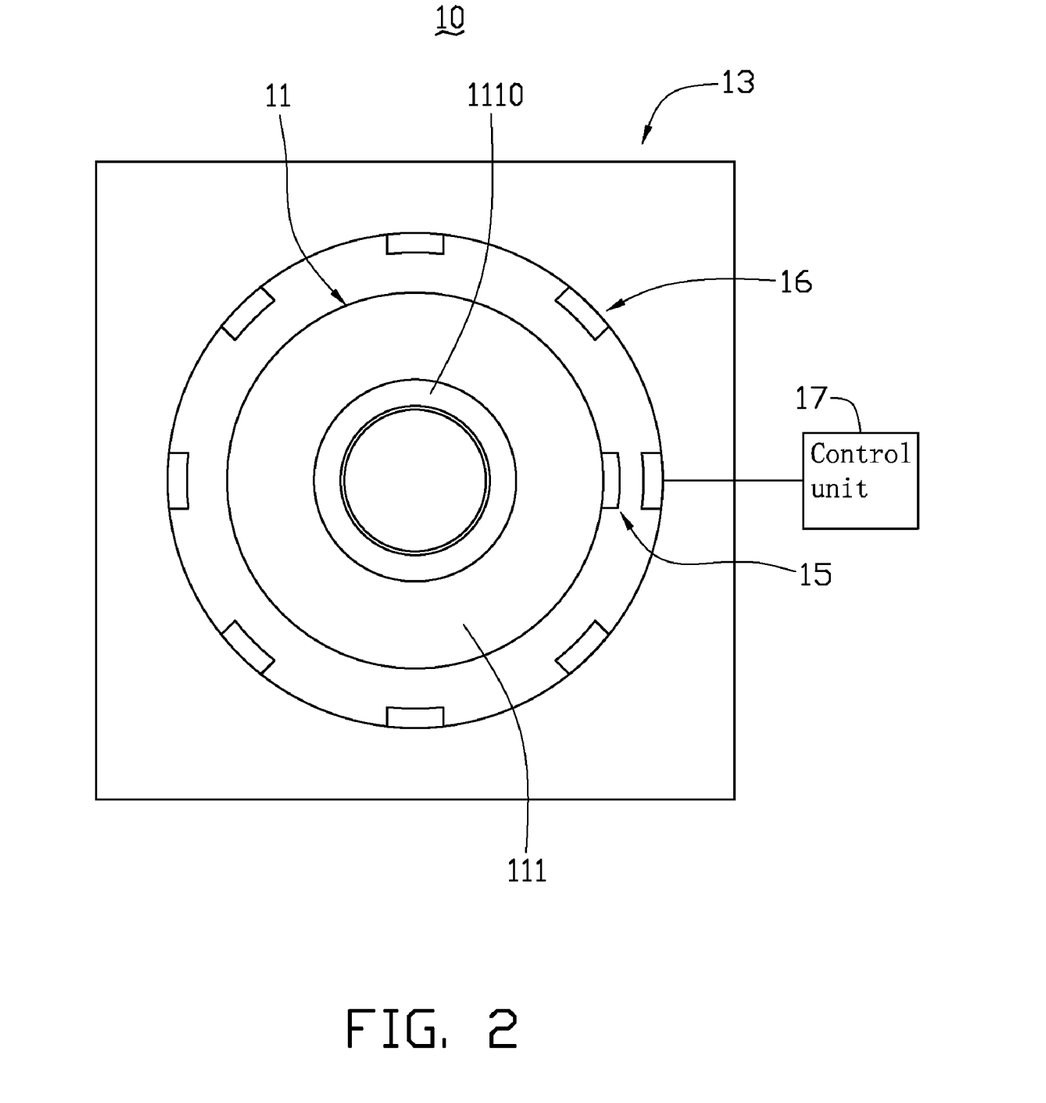
FIG. 2 is a top view of the lens module shown in FIG. 1.

Referring to FIG. 1 and FIG. 2, an exemplary lens module 100 that is capable of auto focusing, according to a first embodiment, includes a barrel 11, an optical assembly 12, a holder 13, an image sensor 14, a permanent-magnet 15, a number of electromagnets 16 and a control unit 17.

The barrel 11 is substantially in the form of a hollow cylinder and is received in the holder 13. The barrel 11 includes a sidewall 110 having an inner surface 1101 and an outer surface 1102 thereon. The barrel 11 includes a first end 111 and an opposite second end 112. A number of screw threads are defined in the outer surface 1102 either partially or entirely so that the barrel 11 can be partially or entirely threadedly engaged in the holder 13. The barrel 11 is capable of being linearly movable relative to the holder 13. In the illustrated embodiment, the screw threads are defined in the outer surface 1102 adjacent to the second end 112 so that the barrel 11 is partially threadedly engaged in the holder 13. The barrel 11 is configured (i.e., structured and arranged) for receiving the optical assembly 12 fixed on the inner surface 1101 by adhesive therein. The first end 111 of the barrel 11 defines an aperture 1110 therein. The aperture 1110 is configured for receiving light beams therethrough into the lens module 10. A central axis of the aperture 1110 and a central axis 120 of the barrel 11 are essentially coaxial. The second end 112 is partially screwed into the holder 13.

The optical assembly 12 includes a number of optical components configured for optically communicating with the image sensor 14 to capture images. In the illustrated embodiment, the optical assembly 12 includes a focusing lens unit 121 and a filter 122. The focusing lens unit 121 includes a first lens 1211, a second lens 1212, and a third lens 1213. The first lens 1211, the second lens 1212, the third lens 1213 and the filter 122 are received in the barrel 10 in the order written from the first end 111 to the second end 112 of the barrel 11 along the central axis 120 of the barrel 11. The first lens 1211, the second lens 1212 and the third lens 1213 are usually made of glass or resin, and can be aspherical lenses or spherical lenses. The filter 122 is usually an infrared-cut filter or an ultraviolet-cut filter. The filter 122 is configured for allowing light in the visible spectrum passing therethrough while blocking light in the infrared/ultraviolet spectrum and is used to prevent interference from infrared/ultraviolet radiation. Additionally, a number of spacers 123 are disposed between two neighbouring optical components, for example, between the first lens 1211 and the second lens 1212, between the second lens 1212 and the third lens 1213, and between the third lens 1213 and the filter 122. Each of the spacers 123 is configured for separating the two neighbouring optical components, thereby forming a space therebetween.

The holder 13 includes a first holding portion 131 and a second holding portion 132 connecting to the first holding body 131. The first holding portion 131 is substantially in the form of a hollow cylinder. The second holding portion 132 can be in the form of a hollow tube-shaped, for example, a hollow square tube-shaped, as illustrated. An outer diameter of the first holding portion 131 is less than a width/length of the second holding portion 132. Thus, a step 133 is formed between the first holding portion 131 and the second holding portion 132. The first holding portion 131 is coupled with the second end 112 of the barrel 11 so that the holder 13 engages with the barrel 11. A number of screw threads are defined in an inner surface 1311 of the first holding portion 131 so that the second end 112 of the barrel 11 can be partially or entirely threadedly engaged into the first holding portion 131 of the holder 13. The second holding portion 132 is configured for receiving the image sensor 14.

The image sensor 14 is received in the second holding portion 132. In the present embodiment, the image sensor 14 is mounted on a printed circuit board 141 connected to the second holding portion 132 of the holder 13. The optical assembly 12 including the first lens 1211, the second lens 1212, the third lens 1213 and the filter 122 in the barrel 10 optically communicates with the image sensor 14 in the holder 13 to capture images. The image sensor 14 detects optical information and generates electronic signals corresponding to the optical information. The image sensor 14 can be a charge coupled device (CCD) or a complementary metal oxide semiconductor (CMOS).

The permanent magnet 15 can either be mounted on the outer surface 1102 or mounted in the sidewall 110 of the barrel 11 between the inner surface 1101 and the outer surface 1102. Advantageously, in the present embodiment, the permanent magnet 15 is mounted on the outer surface 1102 adjacent to the first end 111 of the barrel 11. A lengthwise direction of the permanent magnet 15 is parallel to the central axis 120. Two opposite magnetic polarities of the permanent magnet 15 are respectively at the two opposite ends of the permanent magnet 15 along the lengthwise direction. The permanent magnet 15 can be a rare earth magnet, a ceramic magnet, an alnico (aluminum-nickel-cobalt) magnet, an Nd—Fe—B (neodymium-iron-boron) magnet, a ferrite magnet, and so on.

The electromagnets 16 are mounted on the holder 13 and surround the barrel 11 therein. Preferably, the electromagnets 16 mounted on the holder 13 are equidistantly spaced. It is to be understood that the electromagnets 16 can also be mounted on the first holding portion 131, or mounted on the step 133, or mounted on the second holding portion 132. In the illustrated embodiment, the lens module 10 includes eight electromagnets 16. The electromagnets 16 are equidistantly spaced. A lengthwise direction of each of the electromagnets 16 is parallel to the lengthwise direction of the permanent magnet 15 (i.e., the central axis 120). Two opposite magnetic polarities of each of the electromagnets 16 are respectively at the two opposite ends of each of the electromagnets 16 along the lengthwise direction. One of the electromagnets 16 faces the permanent magnet 15, i.e., the two magnetic polarities of the one of the electromagnets 16 are respectively face the two magnetic polarities of the permanent magnet 15.

Each of the electromagnets 16 includes a soft magnetic portion 1601 wound up a coil 1603, and a non-magnetic portion 1602. The soft magnetic portion 1601 faces the permanent magnet 15. A length of the soft magnetic portion 1601 is equal to that of the permanent magnet 15. The coil 1603 electrically connects to a power 1604. When an electric current supplied by the power 1604 flows in the coil 1603, two opposite magnetic polarities of the soft magnetic portion 1601 are formed, thereby generating a magnetic field. The two magnetic polarities of the soft magnetic portion 1601 respectively face the two magnetic polarities of the permanent magnet 15, thereby forming a magnetic torsional force between the permanent magnet 15 and the electromagnets 16. The electromagnets 16 are configured for magnetical interaction with the permanent magnet 15. The magnetic polarities of the soft magnetic portion 1601 can be changed by controlling a direction of the electric current flowing in the coil 1603.

It is noted that the non-magnetic portion 1602 can also be wound up the coils 1603, thereby extending the soft magnetic portion 1601.

The control unit 17 respectively electrically connects to the power 1604 of each of the electromagnets 16, and electrically connects to the image sensor 14 via the printed circuit board 141. The control unit 17 is configured for receiving the electronic signals from the image sensor 14, changing the magnetic polarities of the electromagnets 16 adjacent to the permanent magnet 15 to create a combined magnetic torsional force applied onto the permanent magnet 15, thereby rotating the barrel 10 relative to the holder 13 based on the received electronic signals. The control unit 17 includes a processing circuitry (not shown) and a driving circuitry (not shown). The processing circuitry is configured for processing the electronic signals from the image sensor 14, thereby obtaining a result regarding a movement direction and a movement distance of the optical assembly 12. The driving circuitry is configured for controlling the direction of the electric current flowing in the coil 1603 of each of the electromagnets 16 according to the result of the processing circuitry, thereby changing the magnetic polarities of the corresponding electromagnets 16. Thus, the combined magnetic torsional force between the permanent magnet 15 and the electromagnets 16 can be changed. The barrel 11 rotates around the central axis 120, thereby moving linearly with respect to the holder 13. Linear movement of the barrel 11 will be transmitted to the optical assembly 12 received in the barrel 11, and thus the optical assembly 12 will carry out a synchronous linear movement to achieve auto focusing.

Figure 3:
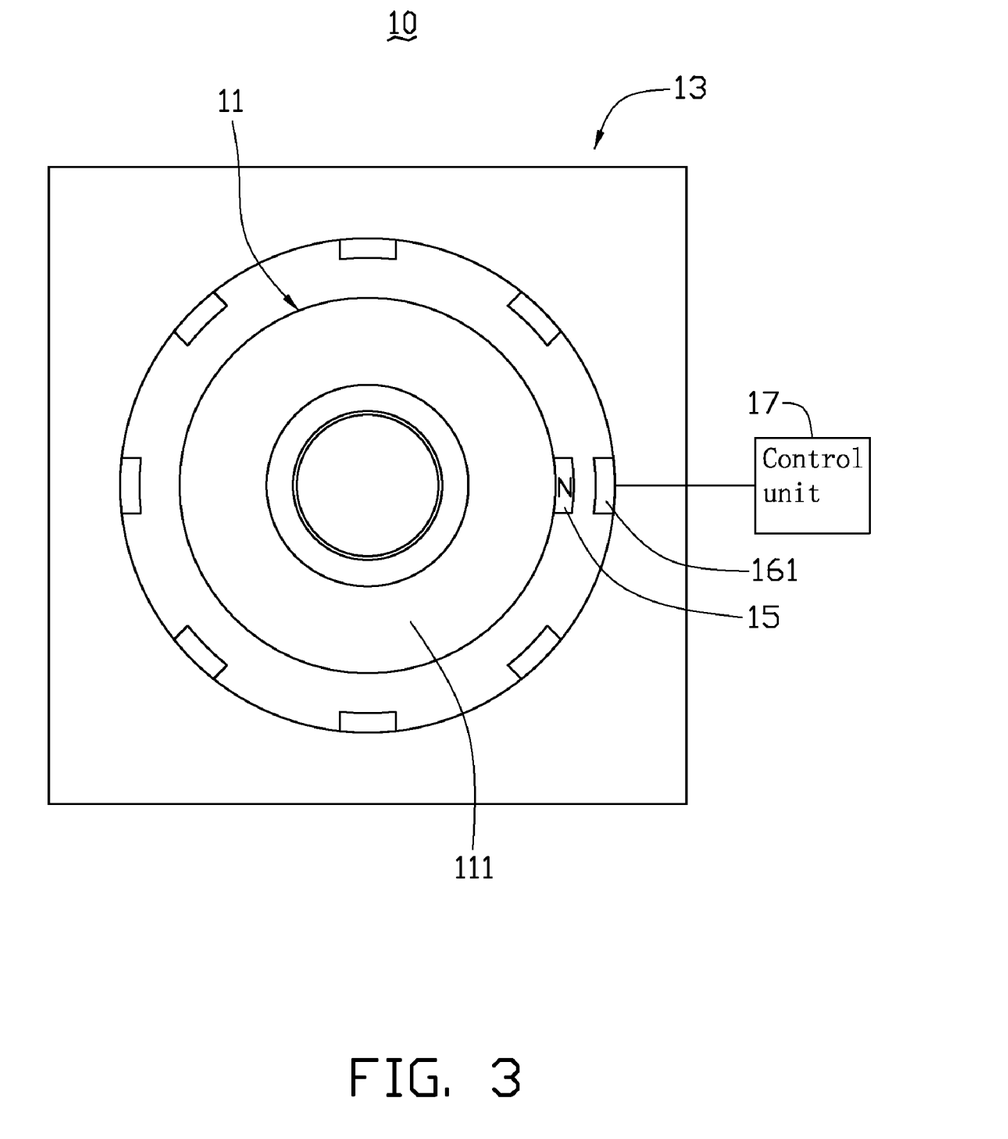
FIG. 3 is a top view of the lens module shown in FIG. 1 before auto focusing of the lens module.

For example, referring to FIG. 1 and FIG. 3, before auto focusing of the lens module 10, the permanent magnet 15 faces a first electromagnet 161. The N polarity of the permanent magnet 15 is adjacent to the first end 111 of the barrel 11. Upon the condition where the optical assembly 12 moves downwards with respect to the holder 13 to focus according to the result from the control unit 17 regarding the movement direction and the movement distance of the optical assembly 12, referring to FIG. 4, the control unit 17 regulates the electric current to flow in a counter-clockwise direction in the coil 1603 of the electromagnet 161 so that the N polarity of the electromagnet 161 is also adjacent to the first end 111 of the barrel 11 and face the N polarity of the permanent magnet 15. Meanwhile, the control unit 17 regulates the electric current to flow in a clockwise direction in the coil 1603 of a second electromagnet 162 neighboring the first electromagnet 161 in a clockwise direction so that the S polarity of the electromagnet 162 is adjacent to the first end 111 of the barrel 11. Thus, a repulsion force between the first electromagnet 161 and the permanent magnet 15, and an attraction force between the second electromagnet 162 and the permanent magnet 15 are produced to cause the barrel 11 to rotate clockwise around the central axis 120. In the illustrated embodiment, referring to FIG. 5, the permanent magnet 15 rotates clockwise ⅛ circle (45 degrees) to the electromagnet 162 due to the repulsion force and the attracting force, and thus the optical assembly 12 received in the barrel 11 moves downwards ⅛ pitch of screws correspondingly.

Figure 4:
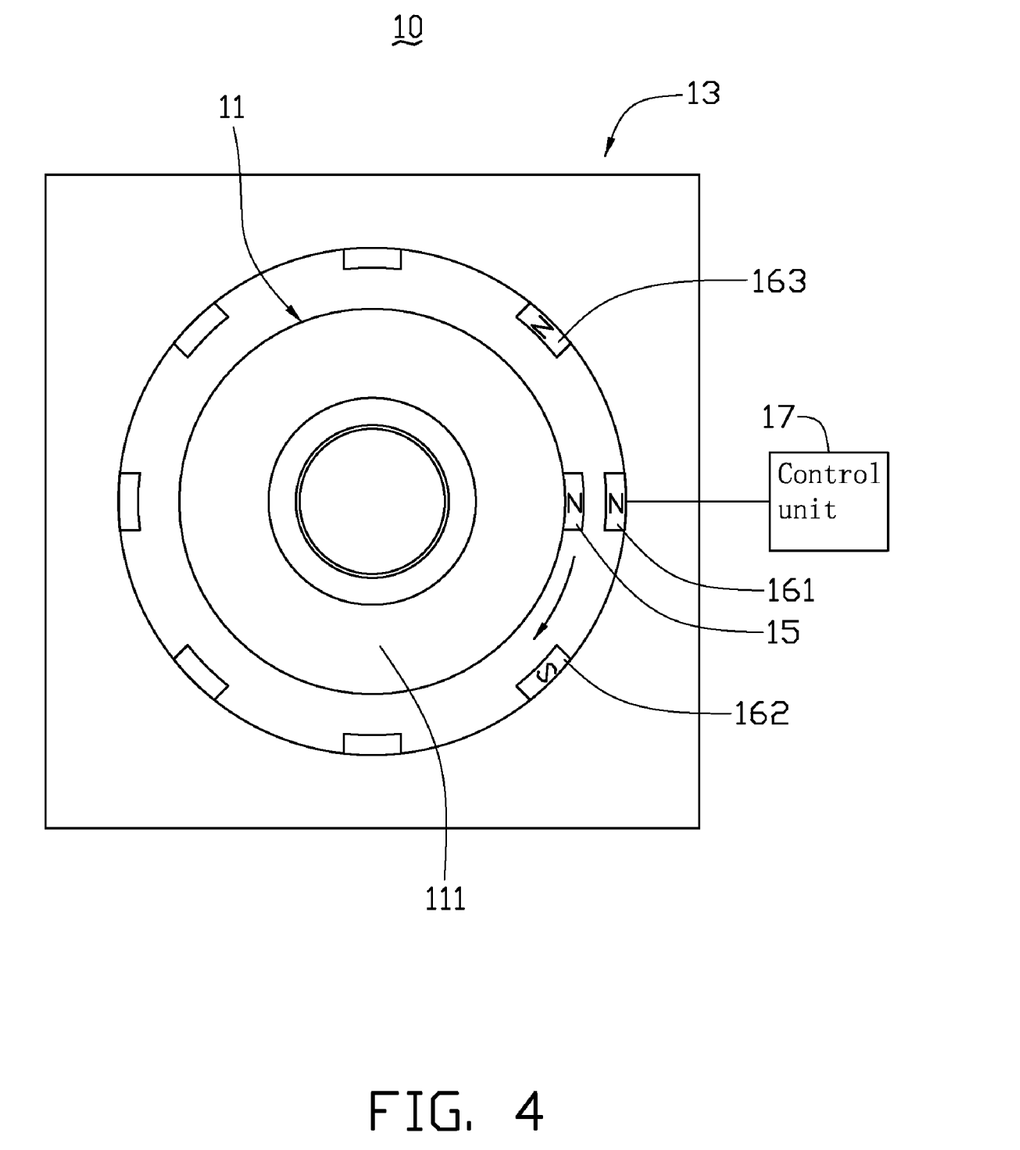
FIG. 4 is a top view of the lens module shown in FIG. 1 during auto focusing of the lens module.
Figure 5:
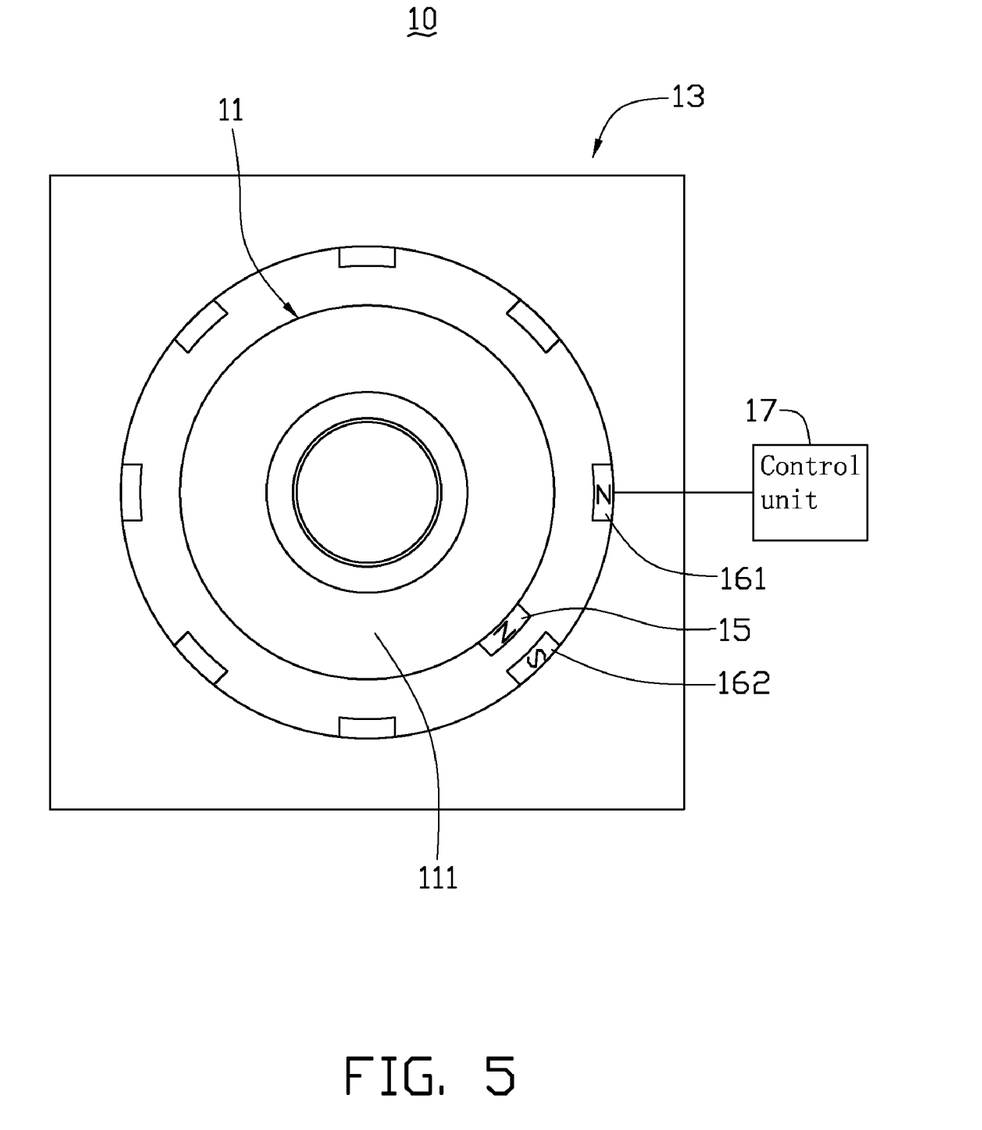
FIG. 5 is a top view of the lens module shown in FIG. 1 after auto focusing of the lens module.

Advantageously, referring to FIG. 4, the control unit 17 can further regulates the electric current to flow in a counter-clockwise direction in the coil 1603 of a third electromagnet 163 neighboring the first electromagnet 161 in a counter-clockwise direction so that the N polarity of the third electromagnet 163 is adjacent to the first end 111 of the barrel 11. Thus, a repulsion force between the third electromagnet 163 and the permanent magnet 15 facilitate clockwise rotating around the central axis 120 of the barrel 11, thereby achieving auto focusing rapidly.

It is understood that, the control unit 17 can further regulates an intensity of the electric current flowing in the coil 1603 of corresponding electromagnets 16 so as to adjust the magnetic force between the permanent magnet 15 and the electromagnets 16, thereby precisely controlling rotation of the barrel 11.

Figure 6:
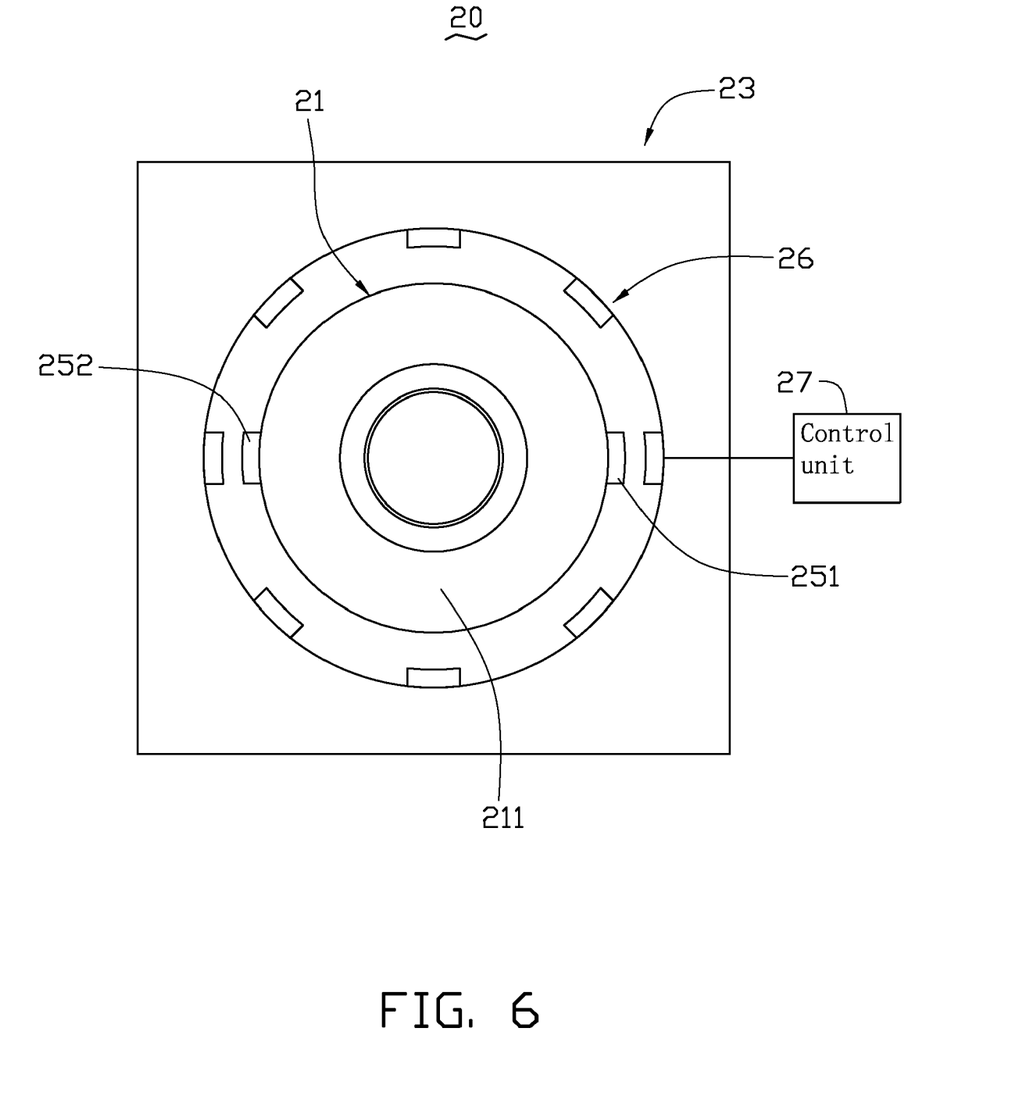
FIG. 6 is a top view of a lens module according to a second embodiment of the present invention.
Figure 7:
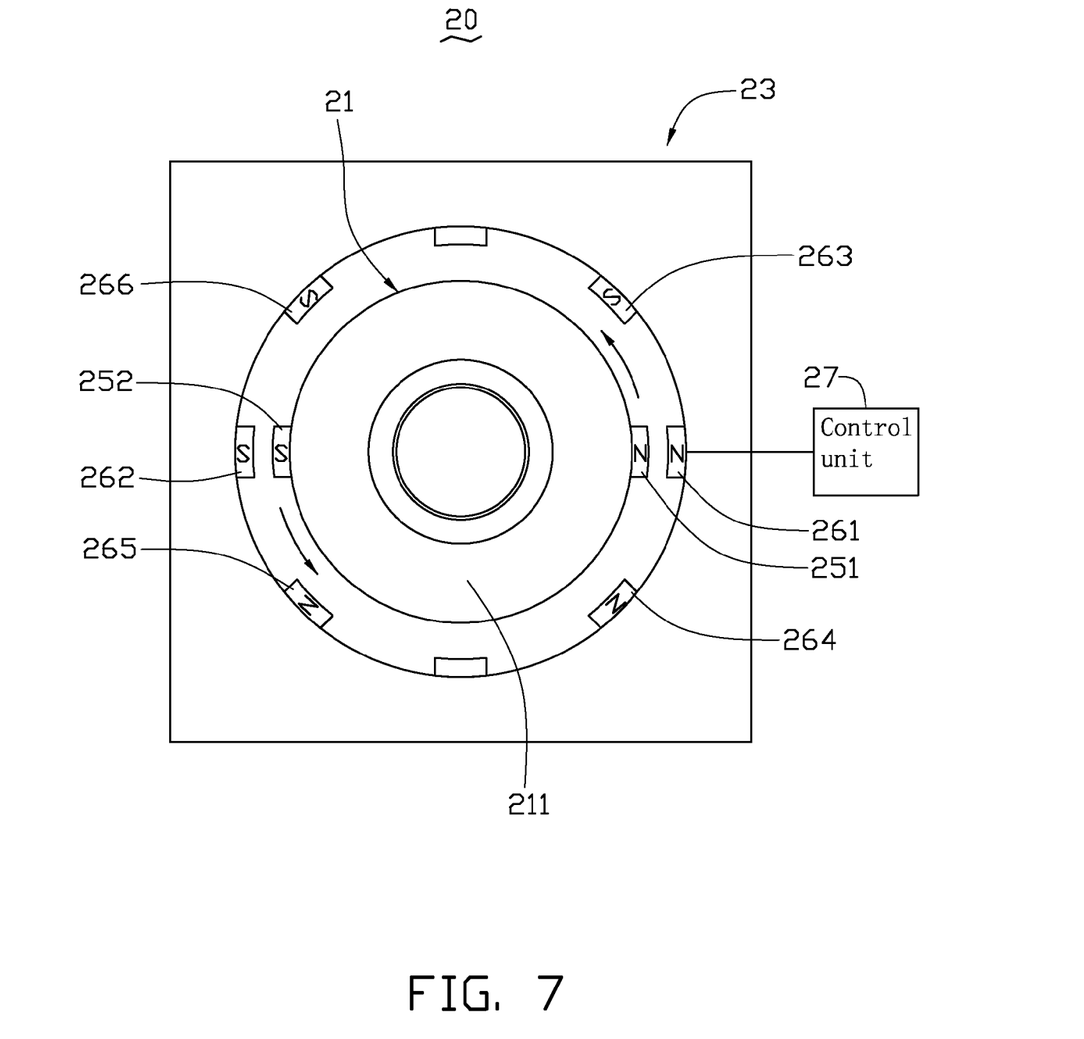
FIG. 7 is a top view of the lens module shown in FIG. 6 before auto focusing of the lens module.

Referring to FIG. 6 and FIG. 7, an exemplary lens module 20 according to a second embodiment is similar to the lens module 10 according to a first embodiment except that the lens module 20 includes a first permanent magnet 251 and a second permanent magnet 252.

For example, before auto focusing of the lens module 20, the first permanent magnet 251 faces a first electromagnet 261 and the second permanent magnet 252 faces a second electromagnet 262. The N polarity of the first permanent magnet 251 is adjacent to the first end 211 of the barrel 21 and the S polarity of the second permanent magnet 252 is adjacent to the first end 211 of the barrel 11. Upon the condition where the optical assembly 22 moves upwards with respect to the holder 23 according to the result from a control unit 27 regarding a movement direction and a movement distance of the optical assembly 22, the control unit 27 regulates the electric current to flow in a counter-clockwise direction in the coil of the first electromagnet 261 and regulates the electric current to flow in a clockwise direction in the coil of the second electromagnet 262 so that the N polarity of the first electromagnet 261 is adjacent to the first end 211 of the barrel 21 and faces the N polarity of the first permanent magnet 251, and the S polarity of the second electromagnet 262 is adjacent to the first end 211 of the barrel 21 and faces the S polarity of the second permanent magnet 252.

Figure 8:
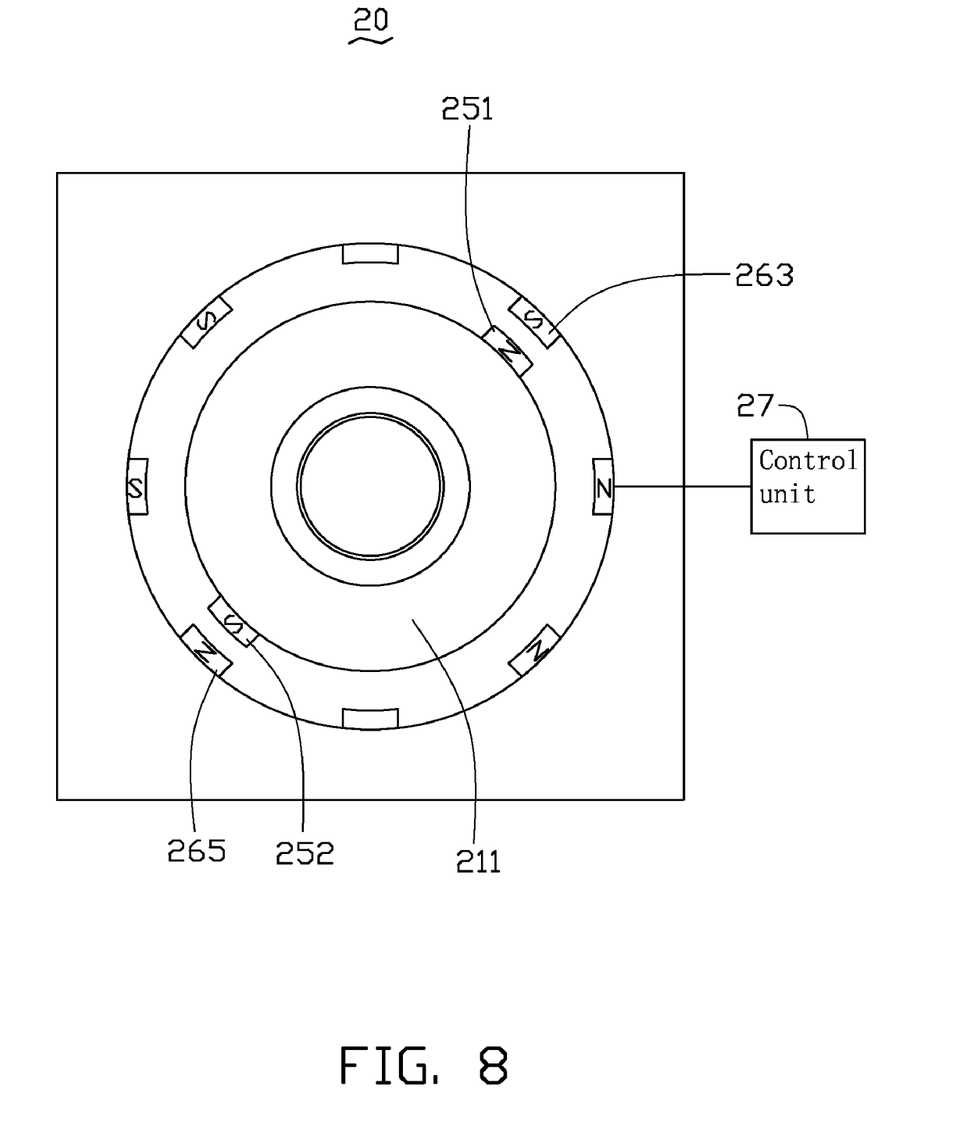
FIG. 8 is a top view of the lens module shown in FIG. 6 after auto focusing of the lens module.

Meanwhile, the control unit 27 regulates the electric current to flow in a clockwise direction in the coil of a third electromagnet 263 neighboring the first electromagnet 261 in a counter-clockwise direction so that the S polarity of the third electromagnet 263 is adjacent to the first end 211 of the barrel 21, and regulates the electric current to flow in a counter-clockwise direction in the coil of a fifth electromagnet 265 neighboring the second electromagnet 262 in a counter-clockwise direction so that the N polarity of the fifth electromagnet 265 is adjacent to the first end 211 of the barrel 21. Thus, referring to FIG. 7, a repulsion force between the first electromagnet 261 and the first permanent magnet 251, a repulsion force between the second electromagnet 262 and the second permanent magnet 252, an attraction force between the third electromagnet 263 and the first permanent magnet 251, and an attraction force between the fifth electromagnet 265 and the second permanent magnet 252 are produced to cause the barrel 21 to rotate counter-clockwise around the optical axis of the barrel 21. In the illustrated embodiment, referring to FIG. 8, due to the repulsion forces and the attracting forces, the first permanent magnet 251 rotates counter-clockwise ⅛ circle (45 degrees) to the third electromagnet 263, the second permanent magnet 152 rotates counter-clockwise ⅛ circle (45 degrees) to the fifth electromagnet 265, and thus the barrel 21 moves upwards ⅛ pitch of screws.

Advantageously, referring to FIG. 7, the control unit 27 can further regulates the electric current to flow in a counter-clockwise direction in the coil of a fourth electromagnet 264 neighboring the first electromagnet 261 in a clockwise direction so that the N polarity of the third electromagnet 263 is adjacent to the first end 211 of the barrel 21, and regulates the electric current to flow in a clockwise direction in the coil of a sixth electromagnet 266 neighboring the second electromagnet 162 in a clockwise direction so that the S polarity of the sixth electromagnet 266 is adjacent to the first end 211 of the barrel 21. Thus, a repulsion force between the fourth electromagnet 264 and the first permanent magnet 251, and a repulsion force between the sixth electromagnet 266 and the second permanent magnet 252 facilitate rotation counter-clockwise around the central axis of the barrel 21, thereby achieving auto focus rapidly.

It is understood that, the control unit 27 can further regulates an intensity of the electric current flowing in the coil of corresponding electromagnets. Thus, a magnetic force between the first permanent magnet 251 and the first electromagnet 261, the third electromagnet 263 and the fourth electromagnet 264, and a magnetic force between the second permanent magnet 252 and the second electromagnet 262, the fifth electromagnet 265 and the sixth electromagnet 266 can be adjusted, thereby achieving rotation of the barrel 21 exactly.

Figure 9:
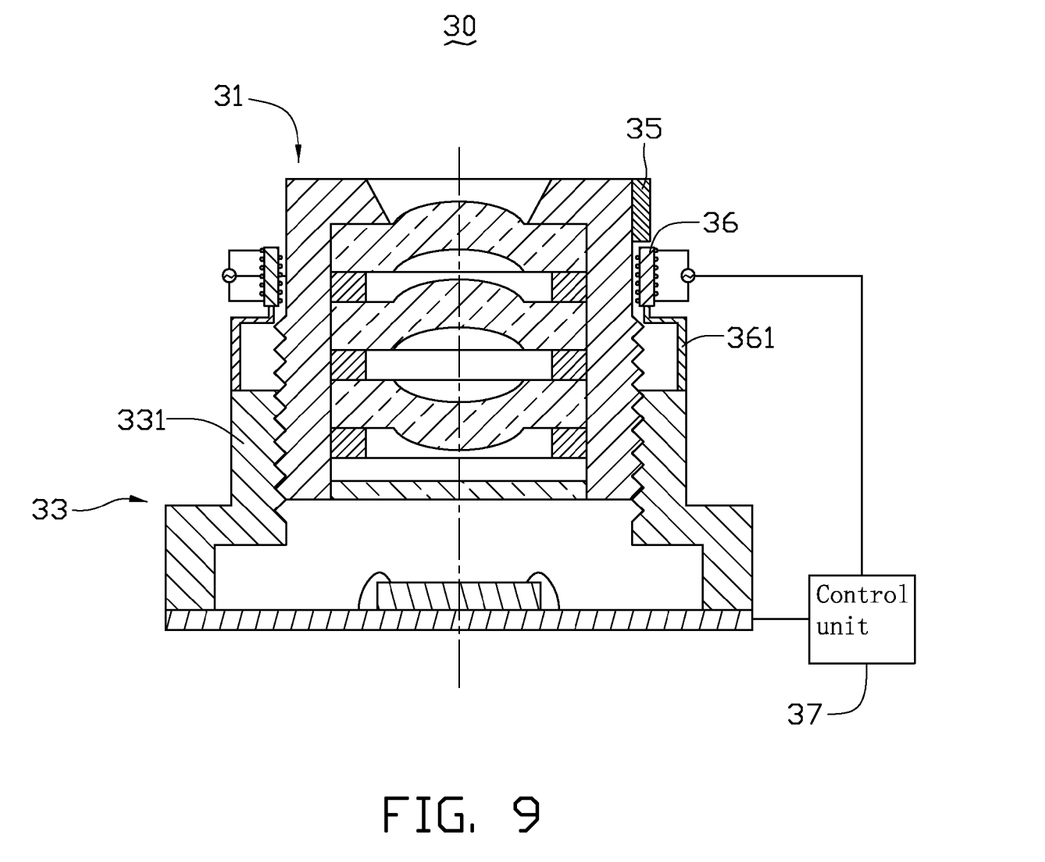
FIG. 9 is a top view of a lens module according to a third embodiment of the present invention.

Referring to FIG. 9, an exemplary lens module 30 according to a third embodiment is similar to the lens module 10 according to a first embodiment. However, a number of electromagnets 36 are mounted on the first holding portion 331 of the holder 33 via a support member 361. The electromagnets 36 are below the permanent magnet 35. One end portion of the permanent magnet 35 faces the one end portion of the corresponding electromagnet 36. During focusing, a repulsion force and an attraction force produced between the permanent magnet 35 and the corresponding electromagnet 36 still can cause the barrel 31 rotates around the central axis thereof, thereby moving linearly with respect to the holder 33.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens module, comprising:
a holder;
a barrel threadedly engaged in the holder, the barrel being linearly movable relative to the holder;
an optical assembly received in the barrel;
an image sensor configured for capturing images;
at least one permanent magnet mounted on the barrel;
a plurality of electromagnets mounted on the holder and surrounding the barrel therein, for magnetical interaction with the permanent magnet; and
a control unit electrically connected to the plurality of electromagnets, the control unit configured for changing the magnetic polarities of the electromagnets adjacent to the permanent magnet to create a combined magnetic torsional force applied onto the permanent magnet, thereby rotating the barrel relative to the holder.

2. The lens module as claimed in claim 1, wherein the permanent magnet is mounted on an outer surface of the barrel.

3. The lens module as claimed in claim 1, wherein the permanent magnet is mounted in a sidewall of the barrel and between an outer surface and an inner surface of the side wall.

4. The lens module as claimed in claim 1, wherein the plurality of electromagnets is equidistantly spaced.

5. The lens module as claimed in claim 1, wherein the holder comprises a first holding portion and a second holding portion connected to the first holding portion, thereby forming a step between the first holding portion and the second holding portion, the barrel is coupled with and screwed into the first holding portion.

6. The lens module as claimed in claim 5, wherein the plurality of electromagnets are mounted on the first holding portion.

7. The lens module as claimed in claim 6, wherein the holder comprises a support member and the plurality of electromagnets is mounted on the first holding portion via the support member.

8. The lens module as claimed in claim 5, wherein the plurality of electromagnets are mounted on the step.

9. The lens module as claimed in claim 5, wherein the plurality of electromagnets are mounted on the second holding portion.

10. The lens module as claimed in claim 5, wherein a lengthwise direction of the permanent magnet is parallel to a central axis of the barrel, two opposite magnetic polarities of the permanent magnet are respectively at the two opposite ends along the lengthwise direction thereof.

11. The lens module as claimed in claim 10, wherein a lengthwise direction of each of the plurality of the electromagnets is parallel to that of the permanent magnet, two opposite magnetic polarities of each of the plurality of the electromagnets are respectively at the two opposite ends along the lengthwise direction thereof.

12. The lens module as claimed in claim 10, wherein the plurality of the electromagnets are below the permanent magnet, and one end portion of the permanent magnet faces the one end portion of the corresponding electromagnet.

13. The lens module as claimed in claim 10, wherein each of the plurality of the electromagnets comprises a soft magnetic portion and a non-magnetic portion.

14. The lens module as claimed in claim 1, wherein the control unit comprises a driving circuitry configured for controlling electric current direction of the plurality of the electromagnets, thereby changing the magnetic polarities of the corresponding electromagnets.

\* \* \* \* \*